United States Patent

[11] 3,597,784

| [72] | Inventor | Hermann Walter Gehlen<br>Pirmasenserstrasse 60, 675 Kaiserslautern,<br>Upper Palatinate, Germany |
| --- | --- | --- |
| [21] | Appl. No. | 842,168 |
| [22] | Filed | July 16, 1969 |
| [45] | Patented | Aug. 10, 1971 |
| [32] | Priority | Apr. 12, 1969 |
| [33] | | Germany |
| [31] | | P 19 18 600.6 |

[54] VEHICLE WITH DISMOUNTABLE RAMP
5 Claims, 12 Drawing Figs.

[52] U.S. Cl. .................................................... 14/1
[51] Int. Cl. .................................................... E01d 1/00

[50] Field of Search............................................ 14/1, 27

[56] References Cited
UNITED STATES PATENTS

| 3,160,900 | 12/1964 | Sedlacek ..................... | 14/27 |
| 3,208,086 | 9/1965 | Gillois et al. ................ | 14/1 |
| 3,491,391 | 1/1970 | Soffge ......................... | 14/1 |

*Primary Examiner*—Jacob L. Nackenoff
*Attorney*—Robert H. Jacob

ABSTRACT: Vehicle with dismountable ramp that is linked to one end of the vehicle and the vehicle is equipped at both ends with additional short driveon ramps.

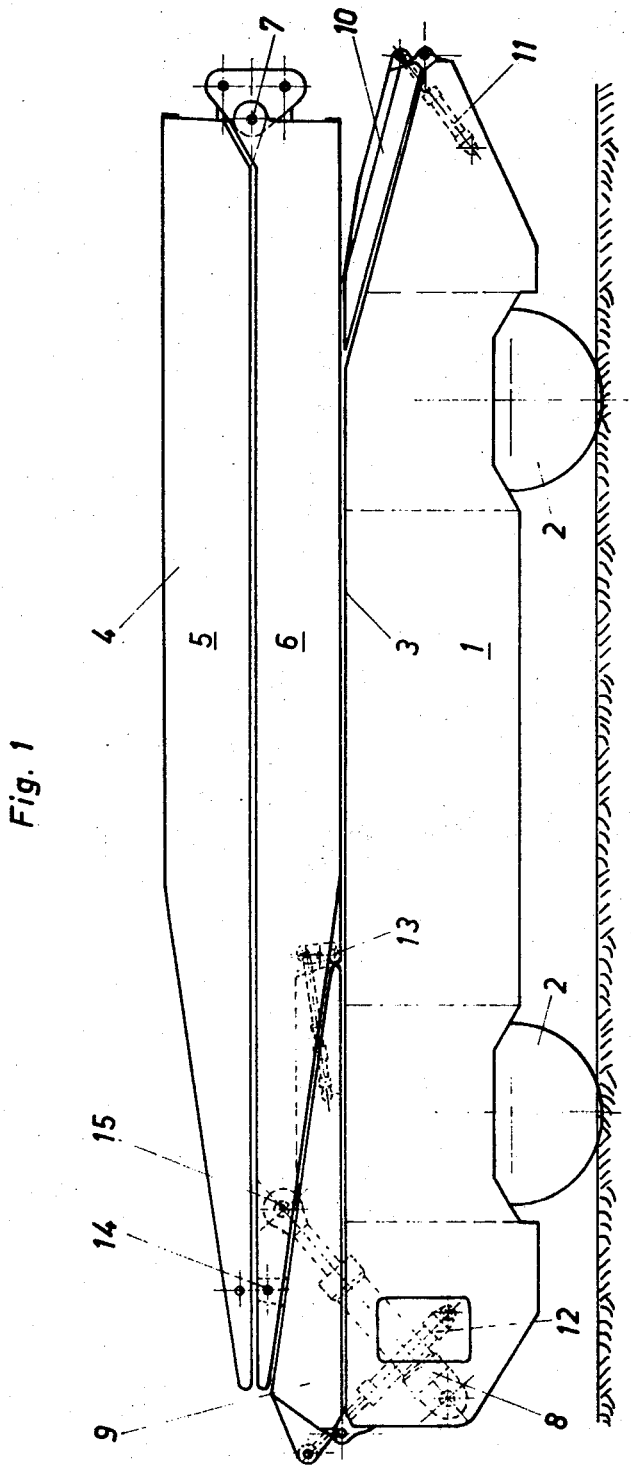

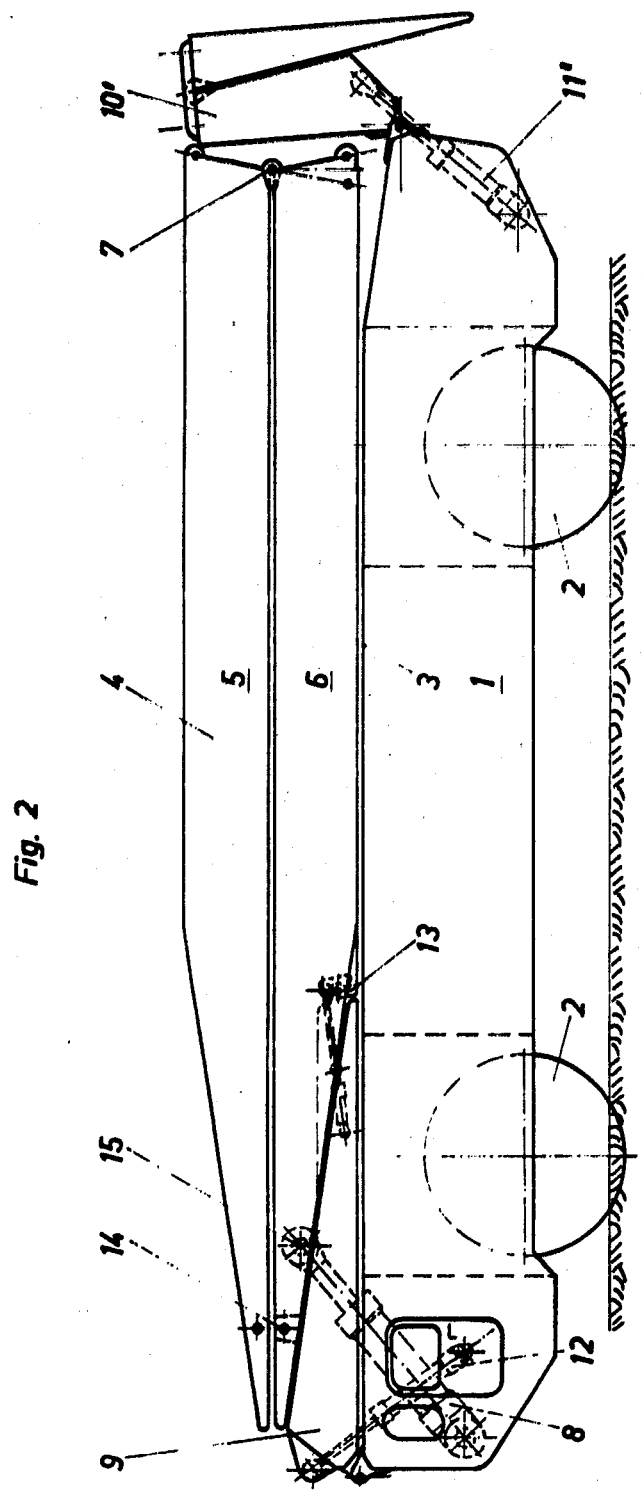

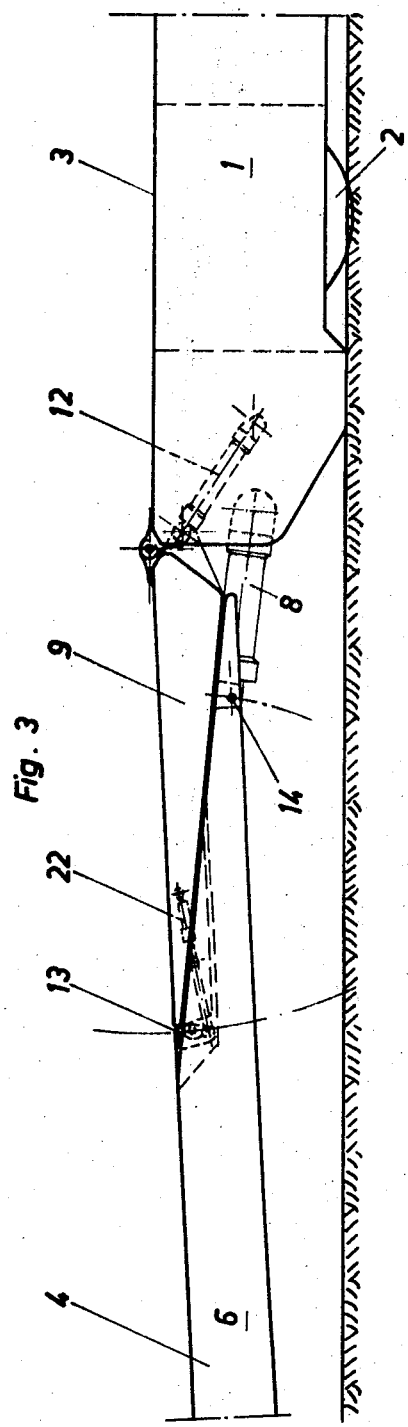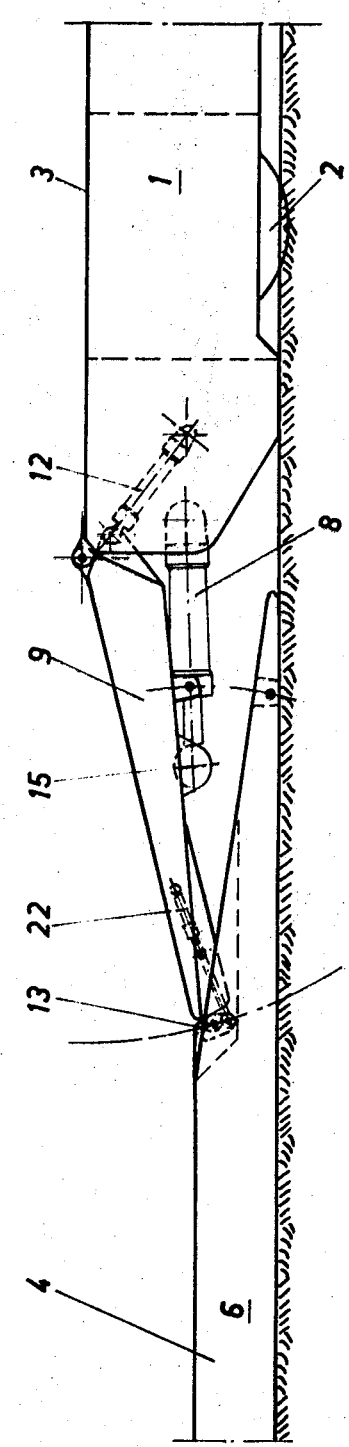

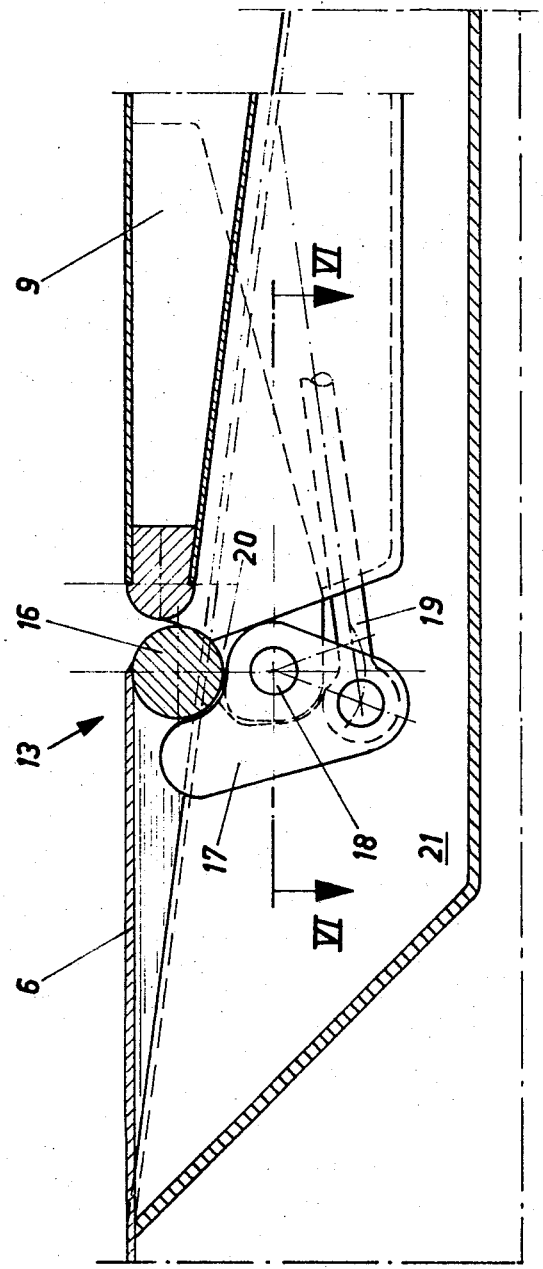
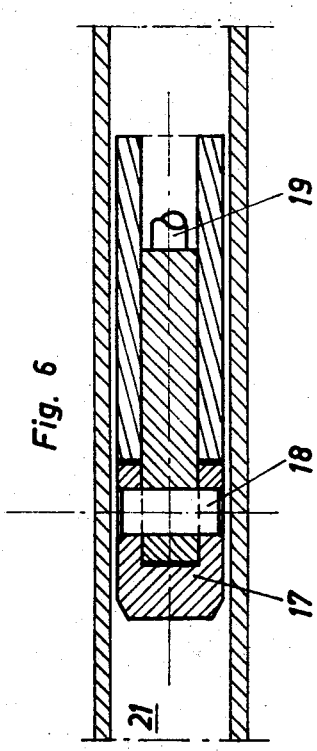

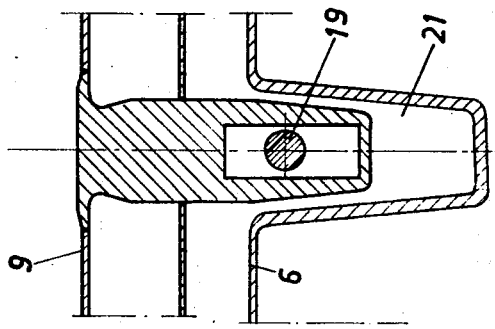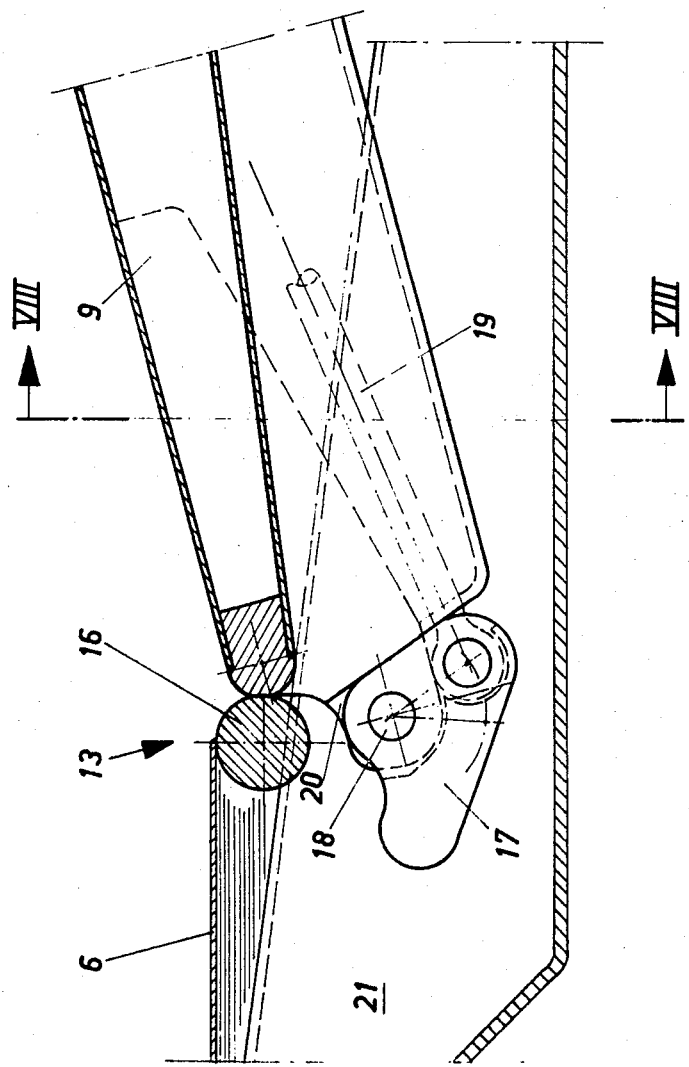

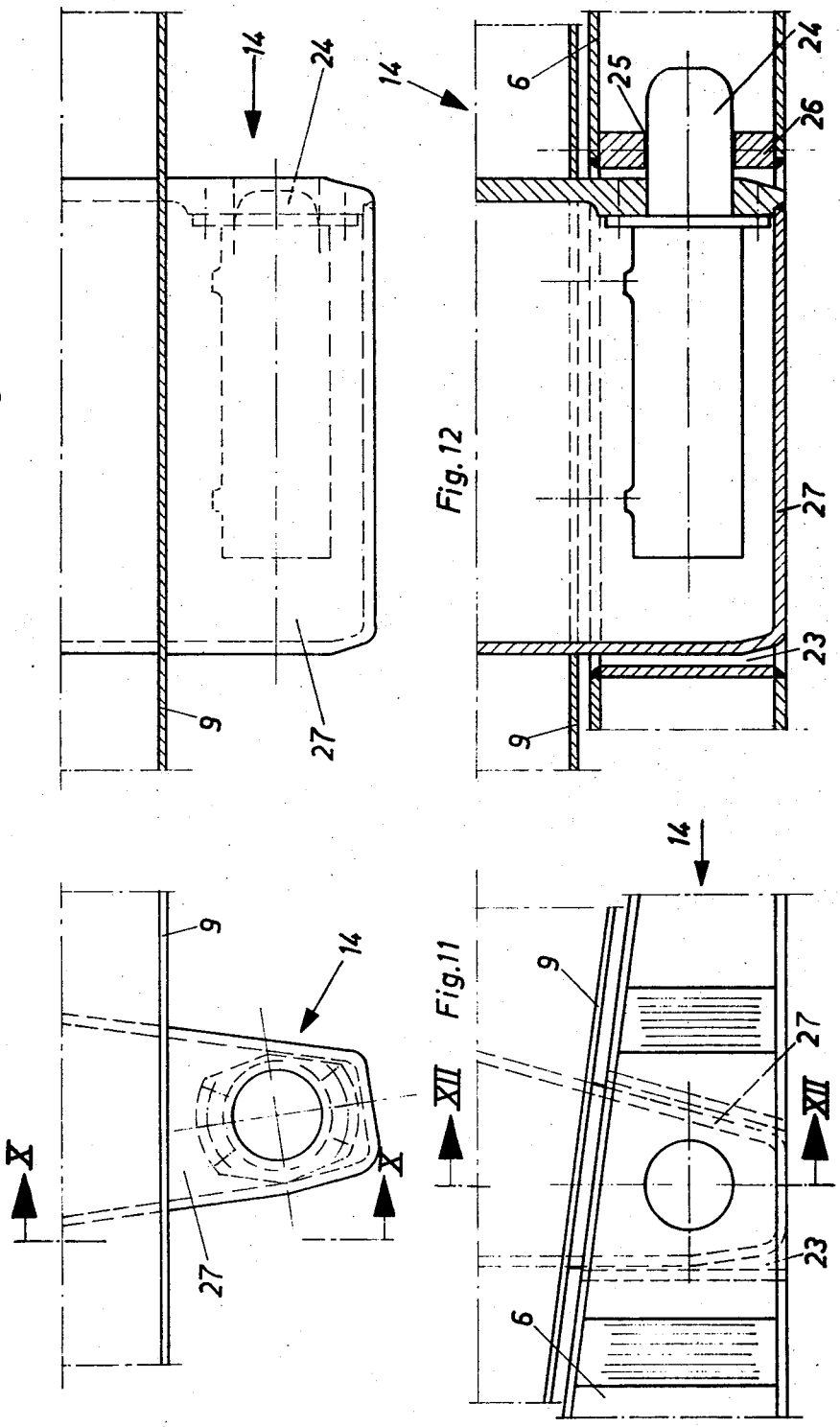

VEHICLE WITH DISMOUNTABLE RAMP

BACKGROUND OF THE INVENTION

The invention relates to a vehicle having a dismountable ramp linked to one of the ends of the vehicle. Different forms of embodiments of such ramp vehicles are known. They serve essentially as "rapid bridge units" expected to be capable to deploy the ramp that is carried along as a bridge over an obstacle within a very short period of time. At the same time the vehicle may also be constructed in a known manner as a conventional light truck chassis, but the vehicle may also under certain conditions be constructed as an amphibious vehicle that can travel on land.

SYNOPSIS OF THE INVENTION

The present invention is based on a vehicle having a deck which is useable either in combination with the ramp that is carried along, or alone, and then again in connection with other vehicles of the same type or alone as a part of a bridge runway, or where an amphibious vehicle is concerned also as a ferry deck or a part of a ferry deck.

With known vehicles having a dismountable ramp the vehicle proper cannot be further deployed for a different purpose after the ramp has been located at its destination. The light truck chassis is not in a position to carry out any other task than that of transporting the ramp. Also, the known vehicles having a flat deck are capable of being deployed only then when at their end which is disposed opposite to the end that is reserved for the ramp to be laid down, they are equipped with a further drive on ramp. The deployment here however is very limited, because the vehicle deck can only be driven on by way of these ramps.

Accordingly, it is an object of the invention, commencing with a vehicle having a dismountable ramp and a deck in the form of a loading platform to construct this vehicle in such a manner that after the ramp has been dismounted or placed, it can also be deployed as a transport vehicle, bridge vehicle, and if constructed as an amphibious vehicle, as a part of a floating bridge or as a ferry, either alone or in combination with further vehicles.

In accordance with the invention, this problem is solved in that besides the dismountable ramp the vehicle is equipped at both ends with further short drive-on ramps which are suitable for driving onto the vehicle deck from both ends. Thus the vehicle after placing or deposing the dismountable ramp does not become useless, but it can be employed for diverse additional use as bridge vehicle, ferry, etc., as already explained above.

Advantageously, the drive-on ramp that is coordinated with the end that is reserved for the dismountable ramp is for this purpose constructed as the deploying element for the dismountable ramp.

In this connection it has proven to be particularly advantageous to construct the drive-on ramp in such a manner that when swinging out the dismountable ramp it forms a part of the same and adapts itself structurally to the dismountable ramp in the area in which it is linked on.

The drive-on ramp provided at the opposite end can either be constructed to be collapsible for the transport position and connectable, or it can preferably be connected in where the end of the vehicle is inclined downwardly in the space thus created between the deck of the vehicle and the dismountable ramp.

The drive-on ramp serving as deploying element for the dismountable ramp is connected with the dismountable ramp at three points. One point is provided at the end of the drive-on ramp centrally of its transverse extent. Thus the dismountable ramp can also be picked up without difficulties even when the ramp and the vehicle are disposed at an angle relative to one another. The two other points are located at the sides of the drive-on ramp serving as deploying element.

The deploying element serving simultaneously as a drive-on ramp can be swung as a part of the dismountable ramp together with the dismountable ramp by means of a main cylinder, and is provided with an additional auxiliary cylinder that serves for overcoming the dead point when unfolding the dismountable ramp.

The dismountable ramp is constructed in a known manner as a ramp folded once transversely of its longitudinal direction while the length of one part of this ramp corresponds essentially to the length of the vehicle.

The connecting means between the dismountable ramp and the deploying element that serves simultaneously as a drive-on ramp, are constructed at the pivot point as a transversely extending shaft and as levers encompassing the same and pivotally movable out of their gripping position and at the further rigid point of connection as prongs that engage corresponding lugs.

BRIEF DESCRIPTION OF THE DRAWINGS

Further features and details of the invention and advantages obtained thereby will become apparent from the following description of the accompanying drawings illustrating schematically and by way of example embodiments of the subject of the invention and in which FIG. 1 shows the vehicle in accordance with the invention in a side view, FIG. 2 illustrates a modified embodiment of the same, FIG. 3 is a partial view of the vehicle and of the dismountable ramp with the ramp unfolded, FIG. 4 is the same view with the ramp lowered, FIG. 5 is a longitudinal section drawn to an enlarged scale through the pivotable point of connection between dismountable ramp and the deploying element that serves simultaneously as the drive-on ramp, FIG. 6 is a section taken along line VI—VI of FIG. 5, FIG. 7 is a section through the same area with lowered and deposited ramp and with the connecting members open, FIG. 8 is a section along the line VIII—VIII in FIG. 7, FIG. 9 shows a detail of the other connecting point between dismountable ramp and deploying element in a side view, FIG. 10 is a section along the line X—X in FIG. 9, FIG. 11 corresponds to FIG. 9 but the ramp is connected with the deploying element, and FIG. 12 is a section taken along the line XII—XII in FIG. 11.

DESCRIPTION OF THE INVENTION

The vehicle is equipped in a known manner with a vehicle body 1 that is provided with retractable running wheels 2, and may in a given case also be the floating body of an amphibious vehicle. The vehicle body 1 is equipped with a flat deck 3 which can be employed as a loading surface capable of being driven on. A dismountable ramp 4 is the essential equipment component of a vehicle which ramp in the embodiment described comprises two ramp parts 5 ad 6 connected at a transversely extending pivot axis 7 and which essentially corresponds in length to the length of the vehicle body 1. The ramp 4 is dismountably constructed and is swung out by means of a hydraulic cylinder 8 together with a part 9 which can be used simultaneously as a drive-on ramp when the vehicle has deposited the dismountable ramp 4, whereby in the region of the pivot axis 7 additional hydraulic means, known per se, are provided in a known manner which during unfolding of the ramp 4 simultaneously unfold the two ramp parts 5 and 6. Thus the part 9 is simultaneously a deploying element and drive-on ramp.

By means of this construction of the deploying element 9 as a drive-on ramp, it is accomplished that the vehicle does not become useless after ramp 4 has been deposited or, in a given case, when a drive on ramp 10 linked to the opposite end is utilized, is only deployable within limits. The vehicle may now, after ramp 4 has been deposited, by utilizing the drive-on ramps 9 and 10 available at the two ends, be deployed itself completely as is the case with amphibious vehicles known heretofore or with known amphibious bridge vehicles.

In lieu of the drive on ramp 10 a drive on ramp 10' that is pivotally moveable upwardly and foldable can be provided. This however elongates the vehicle in position of transport, while on the other hand, a somewhat larger deck surface 3 useable as a loading platform is obtained with this manner of construction. The ramps 10 and 10' may be pivotable either mechanically or as illustrated in FIGS. 1 and 2, also by hydraulic cylinders 11, respectively 11'.

The part 9 forming the deploying element and drive-on ramp is equipped with a hydraulic rocking cylinder 12. This rocking cylinder 12 serves for aiding the cylinder 8 during the unfolding of the ramp 4 in order to overcome the dead point.

The part 9 is so constructed that it adapts itself in form to that of part 6 of the dismountable ramp 4. It is connected with this part 6 and during the unfolding operation it practically forms a part of the dismountable ramp 4.

Part 9 and part 6 of the dismountable ramp are connected together at three points; namely, at a point 13 centrally of the transverse extend of part 9 and its end, and to points 14 at the sides of the part 9 where fixed connections are provided.

If the dismountable ramp 4 is in the position illustrated in FIG. 3, the connection is released at the point 14 between part 9 and the ramp portion 6 and part 9 can now fulfill its function as a deploying element for the dismountable ramp 4, in that it is further lowered by means of the cylinder 8 until the ramp part 6 which is still pivotally connected at point 13 with the part 9 has been deposited on the ground as shown in FIG. 4.

The linking point of the cylinder 8 with part 9 is at point 15.

During the depositing operation the vehicle body 1 is disposed on the ground with the wheels 2 retracted as illustrated.

If the ramp 4 has been deposed with the aid of part 9 as a deploying element and it has practically become an independent part that bridges some-one obstacle in the terrain, the vehicle will remain a fully deployable bridge vehicle with the drive-on ramp 10 or 11' and with the further part 9 that fulfills the requirement of the further drive-on ramp. Its deck surface 3 can be driven on at one end and departed from at the other end. It is therefore a completely useful bridge vehicle and capable of deployment as an amphibious vehicle that on its own capability is deployable for overcoming obstacles in the terrain or if it is constructed as an amphibious vehicle, as a ferry, part of a ferry or part of a floating bridge.

Advantageously, a transversely extending round bar or rod 16 is provided at part 6 of the dismountable ramp which is encompassed by a lever 17 which is pivotally moveable about a pin 18 with the cooperation of a pulling element 19 and a fixed abutment area 20 of the deploying element 9 of generally tongue shape. The entire arrangement is accommodated in a suitable recess 21 of the part 6, while the moveable parts are arranged at the deploying element 9. The draw or pull bar 19 can be also hydraulically operated by means of a cylinder.

At the further connecting points 14, part 9 is equipped with straps or lugs 27 which engage corresponding recesses 23 in the ramp part 6. The straps 27 are equipped with bolts 24 journaled therein which are under the resetting force of a spring and which in engaged position penetrate recesses 25 in a side wall 26 of the recess 23 in the ramp part 6 and thus latch the parts 6 and 7 together. In the position illustrated in FIG. 3 of the parts 6 and 9 unlatching takes place so that when the cylinders 8 are actuated, the parts 6 and 9 are able to assume the position opposite to that shown in FIG. 4.

Having now described my invention with reference to the embodiments illustrated in the drawings, what I desire to protect by letters patent is set forth in the appended claims.

I claim:

1. Vehicle with dismountable ramp comprising a vehicle body having an upper surface portion and two ends adapted for mounting ramps thereon, at least one deploying and drive-on ramp pivoted to one end of said vehicle body and having a tapered surface, and an elongated dismountable ramp having a tapered section conforming to and overlapping said tapered surface of said deploying ramp, means for coupling said tapered section to said tapered surface so that said ramps constitute a unit pivotable about said vehicle body to be either supported on said vehicle body or to extend therefrom, said means comprising a releasable pivot connection between said deploying and drive-on ramp and said dismountable ramp and a separable connection at a point spaced from said pivot operable to release and drop the overlapping tapered section of said elongated dismountable ramp from said deploying and drive-on ramp to rest on the ground.

2. Vehicle in accordance with claim 1, where said dismountable ramp and the other end of said drive-on ramp are connected at three joints including said releasable pivot.

3. Vehicle in accordance with claim 2, including a hydraulic cylinder operatively connected intermediate said vehicle body and said at least one drive-on ramp, and a hydraulic rocking cylinder connected intermediate said vehicle and said pivot joint for overcoming the dead point during unfolding of said dismountable ramp.

4. Vehicle in accordance with claim 3, where said dismountable ramp comprises a pair of ramp parts each having substantially the same length as said vehicle and pivotally connected to one another transversely of said vehicle at the ends opposite the end connected to said vehicle body.

5. Vehicle in accordance with claim 4, said releasable pivot connection comprising a transversely extending element defining a pivot means disposed intermediate the component defining said deploying ramp and the component defining said dismountable ramp, and secured to one said component, a generally tongue shaped abutment on the other said component, a lever mounted on a pivot pin on the other said component having a gripping arm portion on one side of said pivot pin engageable with said transversely extending element and operative to establish engagement between said transversely extending element and said abutment and having a pulling arm portion on the other side of said pivot pin, and a pulling element connected to said pulling arm.